No. 694,476. Patented Mar. 4, 1902.
B. HOLT.
TRACTION ENGINE.
(Application filed Oct. 7, 1901.)
(No Model.) 2 Sheets—Sheet 2.
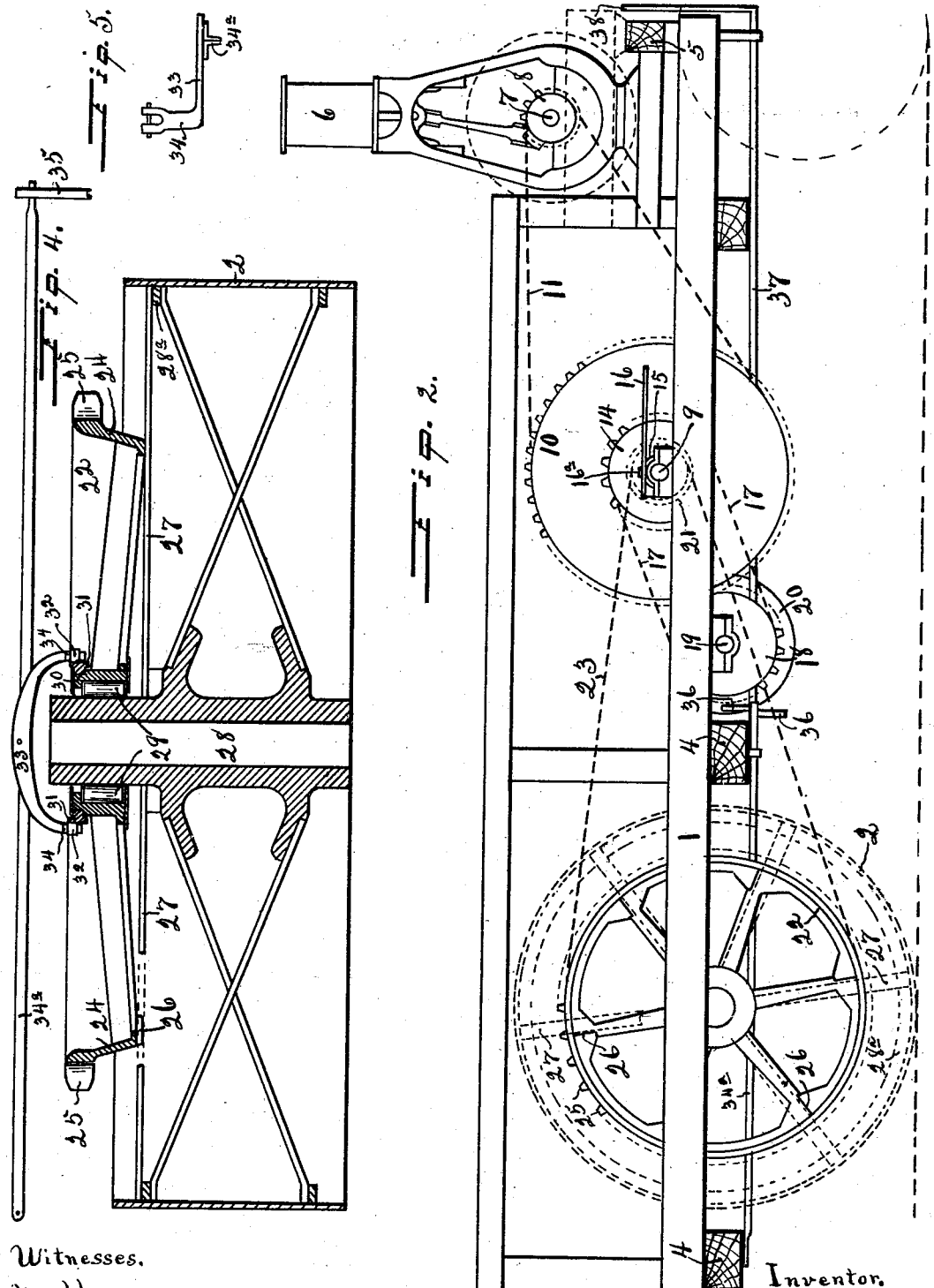
Witnesses.
M. Haynes.
W. G. Hunter.
Inventor.
Benjamin Holt,

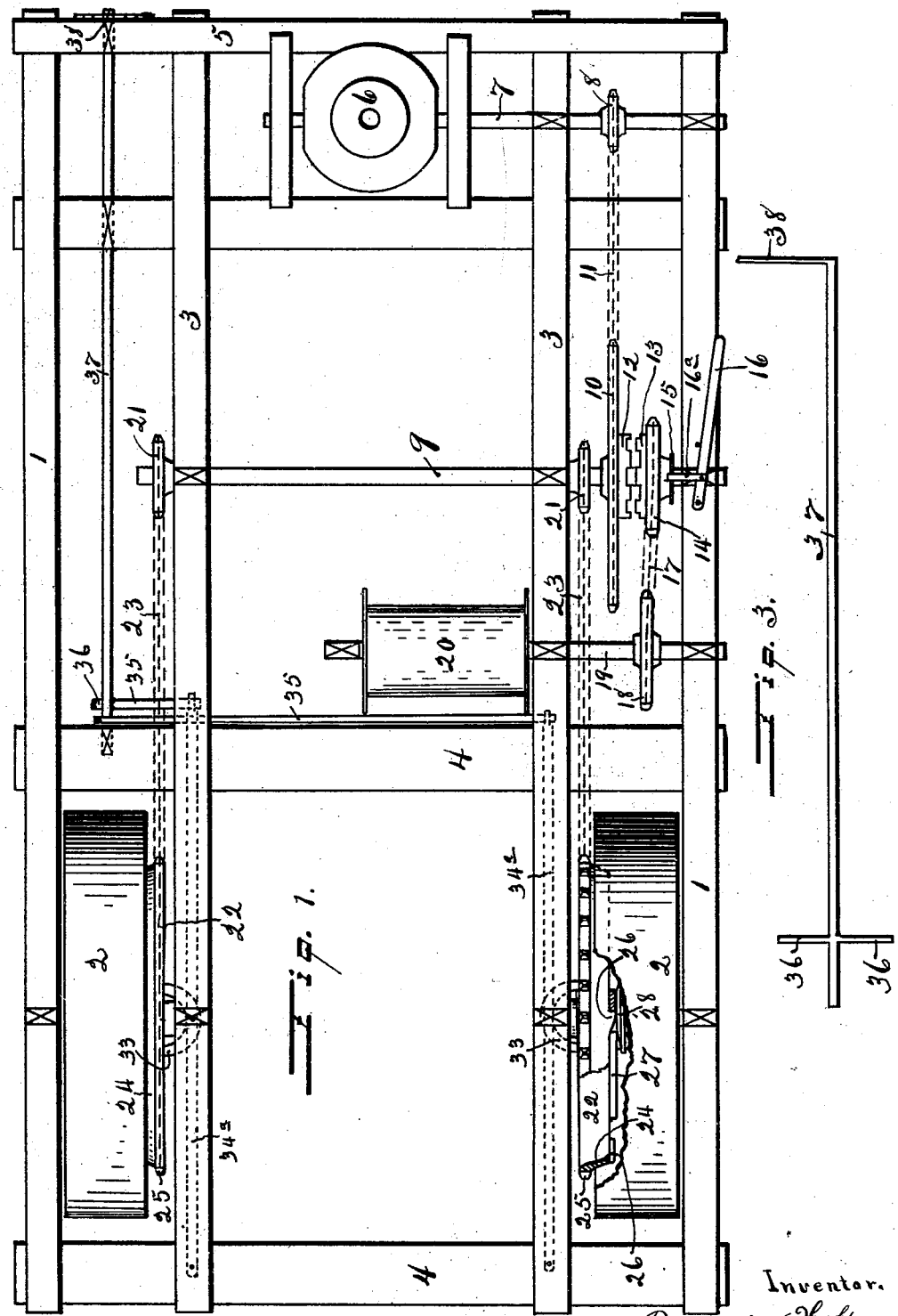

UNITED STATES PATENT OFFICE.

BENJAMIN HOLT, OF STOCKTON, CALIFORNIA.

TRACTION-ENGINE.

SPECIFICATION forming part of Letters Patent No. 694,476, dated March 4, 1902.

Application filed October 7, 1901. Serial No. 77,842. (No model.)

*To all whom it may concern:*

Be it known that I, BENJAMIN HOLT, a citizen of the United States, residing at Stockton, in the county of San Joaquin and State of California, have invented certain new and useful Improvements in Auxiliary Traction-Vehicles for Traction - Engine Freighting-Trains; and I do declare the following to be a full, clear, and exact description of the invention, such as will enable others skilled in the art to which it appertains to make and use the same, reference being had to the accompanying drawings, and to the figures of reference marked thereon, which form a part of this specification.

My invention relates to certain improvements in that class of wagons known as freight-wagons, and more particularly to those which are drawn by a traction-engine or any other motor-vehicle, propelled by steam, from which steam may be obtained, on which I locate an auxiliary engine and suitable sprocket-wheels and shafts in a manner so as to engage and rotate the main bearing-wheels.
My objects are, first, to provide an attachment for a wagon with which the traction-engine or other motor may be assisted up short steep grades and over otherwise rough and difficult stretches of road; second, to allow the free action of the main wheels in turning; third, to permit the disconnection of the attachment from the main wheels at will when not desired for use. These I accomplish by the peculiar construction, novel combination, and adaptation of parts hereinafter described, and particularly pointed out in the claims hereunto annexed, reference being had to the accompanying drawings for a better comprehension hereof, in which—

Figure 1 is a plan view of my improved auxiliary vehicle for traction-engine freighting-trains. Fig. 2 is a right-hand side elevation of the same. Fig. 3 is a detached view of the clutch-operating lever. Fig. 4 is a detached horizontal section of one of the main wheels, showing the connection of the main drive-sprocket therewith. Fig. 5 is a detached view of one of the yokes which engage the shifting rings of the main sprockets.
Similar letters and figures of reference indicate corresponding parts in the several views.

The framework of my vehicle is composed of the longitudinal beams 1, arranged outside of the main wheels 2; the beams 3, located just inside said wheels 2 and having a suitable space between the same; the cross-beams 4, arranged one to the front and one to the rear of the said wheels 2, so as to stiffen the frame, and a cross-beam 5, arranged above the front ends of the longitudinal beams, under which the front wheel is suitably journaled and pivoted.

I arrange a steam-engine 6 of suitable dimensions and type, preferably the vertical type, on the front end of the frame. The crank-shaft 7 is extended on one end, as shown in Fig. 1, and has a sprocket 8 rigidly attached thereon. A counter-shaft 9 is arranged and journaled across the frame, at a suitable point thereon, preferably midway between the main wheels 2 and engine 6, and has a sprocket 10, of suitable dimensions, which is rigidly attached thereto and adapted to be driven by a chain belt 11 from the sprocket 8 on the crank-shaft 7. The sprocket 10 has a mill-clutch 12 formed on one side thereof, which is adapted to engage with a a similar clutch 13, formed on the opposing side of a sprocket 14, which is loosely mounted on the counter-shaft 9 and having a circular plate fitted on or groove 15 formed in the outer hub is controlled by a lever 16, which is pivoted to the frame-beam 1, and has an arm 16$^a$ flexibly attached thereto, which is adapted to engage the hub of the sprocket 14. The sprocket 14 is adapted to receive a chain belt 17, which engages with a sprocket 18, rigidly attached to a shaft 19, journaled and arranged across the frame. A drum 20 is rigidly attached on the shaft 19 for the purposes presently shown.

The counter-shaft 9 has two sprockets 21, arranged one on the outside of either of the longitudinal frame-beams 3 and rigidly attached to said shaft, said sprockets 21 being designed to communicate power to the main drive-sprockets 22 by means of the chain belts 23. The sprockets 22 are each formed, as shown in Figs. 1, 2, and 4, with a flange or ring projecting outwardly from the ends of the spokes for the purpose of receiving the sprocket-teeth 25. On the side of the sprocket 22, near the end of each spoke thereof and next to the wheel 2, notches or clutches 26 are formed, as shown in Figs. 1 and 2, so as to engage with auxiliary spokes 27, which are attached at one end to the hub 28 and extend radially therefrom—and have their other ends rigidly attached to the rim 28ª of the wheel 2. One end of each hub 28 is extended so as to form a bearing for the sprocket 22, which is fitted with roller-bearings 29, which are of ordinary type, as shown in Fig. 4, and are adapted to bear on the hub 28. The hubs of the sprockets 22 have a circular groove 30 cut in one end of each, so as to receive shifting rings 31, which have lugs 32 on opposite sides thereof. A crescent-shaped yoke 33 (shown in Figs. 4 and 6) has two vertically-disposed stems 34, with bifurcated ends adapted to receive the lugs 32, and is pivotally attached to a sliding bar 34ª, near the center thereof longitudinally, which supports the same and prevents the said ring 31 from revolving with the hub of the sprocket 22. The bar 34ª has one end pivoted or hinged at a suitable point on the frame, as shown in Figs. 1 and 2, and the other end is suitably supported, so as to allow the same to be oscillated to and fro, which is done by means of the connecting arms or rods 35, which have one of their ends flexibly attached to the free ends of the bars 34ª and their other ends attached to the free ends of arms 36 which extend in opposite directions from and are attracted to a rock-shaft 37 which is journaled on the frame and provided with a lever 38 at one end arranged at right angles thereto, as shown in Fig. 3. The said lever 38 may be maintained in the desired positions in any suitable manner.

The mode of operating my improved auxiliary vehicle for traction-engine freighting-trains is as follows: Steam may be applied from a suitable boiler to the engine 6 through suitable flexible pipes, of which there are many forms and modes of construction in use, all of which are not new, and I therefore have not shown them in the drawings. The engine 6 having had steam applied is put in motion, and the counter-shaft 9 is rotated by means of the connecting-sprockets 8 and 10 and the chain belt 11. The sprockets 22 are rotated by means of the sprockets 21 and their connecting chain belts 23 and when placed in engagement with the spokes 27 of the wheel 2 cause the said wheels 2 to rotate, thus propelling the vehicle. When it is desired to discontinue the use of the motive power of the wagon on such roads as are descending or otherwise adapted to render the assisting of the traction-engine or other motor unnecessary or when it is desired to operate the drum 20 for any purpose hereinafter described, the operator grasps the lever 38 and presses the same to one side, which rocks the shaft 37, and by means of the arms 36 and the connecting-rods 35 draws the free ends of the rods 34ª together, thus disengaging the sprockets 22 from the spokes 27 of the wheel 2 by means of the yoke 33, which engages with the ring 31 on the hub of said sprocket 22, which allows the same to revolve free of the wheel 2. The lever 16 may then be pressed inwardly, which will lock the mill-clutches 12 and 13 together and cause the rotation of the sprocket 14, and consequently the rotation of the drum 20, by reason of the chain belt 17 and sprocket 18 on the shaft 19. I use the drum for various purposes, among which are the pulling of the wagons of a train to a position suitable for coupling to each other after having been uncoupled for the purpose of loading, for pulling large and heavy articles into the rear wagons, and for assisting the train out of bad places in the road by extending a cable to an object ahead or by driving the engine and wagon past the rough or bad place and then pulling the rear wagons over. As may be readily seen, the drum 20 may be used independently or in conjunction with the traction-power applied to the main wheels 2. While my vehicle is rounding a curve in the road the wheels 2 are allowed to rotate independently of each other by reason of the spokes 27 of the wheel 2, which rotates the faster, pressing the sprocket engaged therewith outwardly and slipping past the notches 26, which is made possible by reason of the flexibility of the sliding bars 34ª, which are designed to spring sufficiently for that purpose. The drum 20 may be uncoupled by pressing the lever 16 outwardly, thus disengaging the clutches 12 and 13. The power may be applied to the wheels 2 by reversing the operation of the lever 38 and its connected parts.

I have designed my invention to be operated by steam-power but I do not confine myself to the use of steam alone as power as an electric motor may be substituted for the engine 6, with equal results, and supplied with electricity from an electric motor-wagon or an electric storage battery located on the auxiliary vehicle.

Many features shown may be rearranged or dispensed with without departing from the spirit of my invention, and I have shown many things which in themselves are not new, but I am not aware that they have been used in the manner shown and described herein.

What I do claim as new, and desire to secure by Letters Patent, is—

1. In a vehicle of the class described the combination with a motor mounted on the frame, of sprockets journaled one on the hub of each main wheel and having notches adapted to engage the spokes of the same and suitable means for the lateral adjustment of the said sprockets all arranged and operating substantially as shown and described and for the purposes set forth herein.

2. In a vehicle of the class described a sprocket having clutches or notches adapted to engage with the main drive-wheel and being journaled on the hub or axle of said main wheel, a ring or yoke adapted to engage the hub of said sprocket, a lever or rod adapted to engage the ring or yoke and suitable means for imparting motion to the said sprocket all arranged and operating substantially as shown and described.

3. In a vehicle of the class described the combination with suitable bearing-wheels of the sprockets 22 having the clutches 26 arranged on the side thereof, and being journaled on the hub 28, the groove 30 formed in the hub of the sprocket 22, the ring 31 fitting in said groove, the yoke 33 34 adapted to engage with the ring aforesaid, the flexible sliding bar $34^a$ pivoted to the frame and engaging the said yoke, suitable means of operating the said bar $34^a$ and suitable means of imparting motion to the said sprockets 22 all arranged and operating substantially as shown and described and for the purposes set forth herein.

4. In a vehicle of the class described the combination with a suitable frame and bearing-wheels of the motor 6 mounted on the frame, the counter-shaft 9 and its sprockets, mounted transversely on the frame, the drum 20 and its shaft 19 also journaled transversely on the frame, the sprockets 22 journaled on the axle of the main drive-wheels 2 and having the clutches 26 adapted to engage said wheels 2, the yokes 33 adapted to engage the hub of the sprockets 22, the bars $34^a$ pivotally attached to the frame and yokes 33 and adapted to spring, flex or bend, the rods 35 attached to the free ends of the said bars $34^a$, the rock-shaft 37 provided with the arms 36 and lever 38 said arms 36 being adapted to engage the rods 35, the lever 16 attached to the frame and adapted to engage the hub of the sprocket 14 and suitable chain belts and sprockets all arranged and operating substantially as shown and described and for the purposes set forth herein.

5. In a vehicle of the class described the combination with a suitable frame and motor mounted thereon, of sprockets journaled independently and having notches or teeth adapted to engage the spokes of the drive-wheels in a manner so as to allow the independent action of said drive-wheels, suitable means for the lateral adjustment of the said sprockets at will and suitable means of imparting motion to the said sprockets all arranged and operating substantially as shown and described and for the purpose specified.

6. In a vehicle of the class described, a traction or main bearing-wheel having the auxiliary spokes 27 arranged radially from the hub and attached to the rim and hub $28^a$ and 28, respectively, said hub 28, having the extended end, as described, the sprocket 22, having teeth adapted to engage said auxiliary spokes 27, journaled on said hub 28, in combination with suitable means for laterally adjusting and communicating motion to the said sprocket 22 all arranged and operating substantially as shown and described and for the purpose set forth.

7. In a vehicle of the class described, the motor resting on the frame and adapted to communicate motion to sprockets arranged in juxtaposition to the main wheels, said sprockets being adapted to engage auxiliary spokes on the said main wheels, by means of ratchet-like teeth, in a manner so as to allow the independent action of said main wheels and suitable means of controlling the action of said sprockets all arranged and operating substantially as shown and described and for the purpose specified.

In witness whereof I have hereunto affixed my signature in the presence of two witnesses.

BENJAMIN HOLT.

Witnesses:
  P. E. HOLT,
  M. HAYNES.